US008942375B2

(12) United States Patent
Frank et al.

(10) Patent No.: US 8,942,375 B2
(45) Date of Patent: Jan. 27, 2015

(54) METHOD AND SYSTEM FOR PROVIDING MULTIPLE ENCRYPTION IN A MULTI-BAND MULTI-PROTOCOL HYBRID WIRED/WIRELESS NETWORK

(75) Inventors: Ed H. Frank, Atherton, CA (US); Richard Martin, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 2248 days.

(21) Appl. No.: 10/658,310

(22) Filed: Sep. 9, 2003

(65) Prior Publication Data

US 2004/0053601 A1   Mar. 18, 2004

Related U.S. Application Data

(60) Provisional application No. 60/433,104, filed on Dec. 13, 2002, provisional application No. 60/411,261, filed on Sep. 17, 2002, provisional application No. 60/411,301, filed on Sep. 17, 2002, provisional application No. 60/435,984, filed on Dec. 20, 2002.

(51) Int. Cl.
*G06F 21/00* (2013.01)
*H04W 12/02* (2009.01)
(Continued)

(52) U.S. Cl.
CPC ............ *H04W 12/02* (2013.01); *G01S 5/0252* (2013.01); *H04L 1/1607* (2013.01); *H04L 12/2856* (2013.01); *H04L 12/2872* (2013.01); *H04L 12/2874* (2013.01); *H04L 12/5695* (2013.01); *H04L 47/125* (2013.01); *H04L 47/14* (2013.01);

(Continued)

(58) Field of Classification Search
USPC .......................... 380/270; 726/4, 15
See application file for complete search history.

(56) References Cited

U.S. PATENT DOCUMENTS 6,088,451 A * 7/2000 He et al. ......................... 726/8
6,493,110 B1   12/2002 Roberts
(Continued)

FOREIGN PATENT DOCUMENTS

EP      1322091 A    6/2003
WO      0219614 A    3/2002

OTHER PUBLICATIONS

EPO Communication dated Dec. 28, 2010 in Application No. 03752183.8-2413 / 1547299.

*Primary Examiner* — Shewaye Gelagay
*Assistant Examiner* — Carlton Johnson
(74) *Attorney, Agent, or Firm* — Oblon, Spivak, McClelland, Maier & Neustadt, L.L.P.

(57) ABSTRACT

Multiple encryption in a multi-band multi-protocol hybrid wired/wireless network may include receiving on a first PHY channel of an access point, a request for initiation of a communication session from an originating access device. The received request may be acknowledged on the first PHY channel and the originating access device may be authenticated on a second PHY channel. One or more encryption/decryption keys may be provided for use during the communication session. A third PHY channel or the first or second PHY channels may host the communication session. The authentication information may be requested and delivered to the originating access device via a second PHY channel. The encryption key may be delivered to the originating access device via the first PHY channel or the second PHY channel. Additionally, information may be tunneled over a virtual channel established between the originating and a terminating access device.

42 Claims, 10 Drawing Sheets

(51) Int. Cl.

| | | |
|---|---|---|
| G01S 5/02 | (2010.01) | |
| H04L 12/28 | (2006.01) | |
| H04L 12/54 | (2013.01) | |
| H04L 12/803 | (2013.01) | |
| H04L 12/801 | (2013.01) | |
| H04L 12/851 | (2013.01) | |
| H04L 12/919 | (2013.01) | |
| H04L 12/915 | (2013.01) | |
| H04L 12/927 | (2013.01) | |
| H04L 12/911 | (2013.01) | |
| H04L 29/06 | (2006.01) | |
| H04W 16/16 | (2009.01) | |
| H04L 29/08 | (2006.01) | |
| H04L 1/16 | (2006.01) | |
| H04L 12/931 | (2013.01) | |
| H04W 12/04 | (2009.01) | |
| H04W 12/06 | (2009.01) | |
| H04W 76/02 | (2009.01) | |
| H04W 80/00 | (2009.01) | |
| H04W 84/12 | (2009.01) | |
| H04W 88/08 | (2009.01) | |

(52) U.S. Cl.
CPC ............... *H04L 47/15* (2013.01); *H04L 47/24* (2013.01); *H04L 47/2408* (2013.01); *H04L 47/767* (2013.01); *H04L 47/785* (2013.01); *H04L 47/805* (2013.01); *H04L 47/824* (2013.01); *H04L 47/825* (2013.01); *H04L 49/205* (2013.01); *H04L 49/351* (2013.01); *H04L 63/0272* (2013.01); *H04L 63/0428* (2013.01); *H04L 63/0478* (2013.01); *H04L 63/061* (2013.01); *H04L 63/08* (2013.01); *H04L 63/10* (2013.01); *H04L 63/18* (2013.01); *H04W 12/04* (2013.01); *H04W 12/06* (2013.01); *H04W 16/16* (2013.01); *H04W 76/02* (2013.01); *H04W 80/00* (2013.01); *H04W 84/12* (2013.01); *H04W 88/08* (2013.01); *H04L 67/14* (2013.01); *H04L 67/18* (2013.01); *H04L 67/327* (2013.01); *H04L 69/18* (2013.01); *H04L 69/14* (2013.01); *H04L 69/324* (2013.01); *H04L 69/329* (2013.01)
USPC ............................................ 380/33; 380/270

(56) References Cited

U.S. PATENT DOCUMENTS

| | | | |
|---|---|---|---|
| 6,571,221 | B1 | 5/2003 | Stewart et al. |
| 6,751,729 | B1* | 6/2004 | Giniger et al. ................ 713/153 |
| 7,039,027 | B2* | 5/2006 | Bridgelall ..................... 370/329 |
| 7,174,564 | B1* | 2/2007 | Weatherspoon et al. ......... 726/2 |
| 7,325,058 | B1* | 1/2008 | Sheth et al. .................... 709/225 |
| 2003/0061503 | A1 | 3/2003 | Katz et al. |
| 2003/0140131 | A1* | 7/2003 | Chandrashekhar et al. .. 709/223 |

* cited by examiner

METHOD AND SYSTEM FOR PROVIDING MULTIPLE ENCRYPTION IN A MULTI-BAND MULTI-PROTOCOL HYBRID WIRED/WIRELESS NETWORK

CROSS-REFERENCE TO RELATED APPLICATIONS/INCORPORATION BY REFERENCE

This application makes reference to, claims priority to, and claims the benefit of:

U.S. Provisional Patent Application Ser. No. 60/433,104 entitled "Method and System for Providing Multiple Encryption in a Multi-band Multi-protocol Hybrid Wired/Wireless Network" filed on Dec. 31, 2002;

U.S. Provisional Patent Application Ser. No. 60/411,261 entitled "Communications Systems Software and Protocols" filed on Sep. 17, 2002;

U.S. Provisional Patent Application Ser. No. 60/411,301 entitled "Method and System for Providing a Scalable Integrated Switch and Wireless Architecture" filed on Sep. 17, 2002; and U.S. Provisional Application Ser. No. 60/435,984 entitled "Communication System and Method in a Wireless Local Area Network" filed on Dec. 20, 2002.

The above stated applications are all incorporated herein by reference in their entirety.

FIELD OF THE INVENTION

Embodiments of the present application relate generally to hybrid wired/wireless networking, and more particularly to a method and system for providing multiple encryption in a multi-band multi-protocol hybrid wired/wireless network.

BACKGROUND OF THE INVENTION

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of 19 meters (m) in a frequency range of 2.4 GHz to 2.4835 GHz. The 802.11b standard for example, may be adapted to provide a maximum data rate of about 11 Mbps at a transmitter/receiver range of 57 meters (m) in a frequency range of 2.4 GHz to 2.4835 GHz. Finally, the 802.11a standard for example, provides a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a CSMA/OA or a ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In hybrid wired/wireless networks that utilize one or more protocols in the 802.11 suite of protocols, the mobility of access devices throughout the network may pose additional challenges for conventional switches and switching equipment. Since access devices are continuously changing their point of access to the network, conventional switches may not have the capability to effectively control other network devices and/or entities in order to provide seamless communication throughout the network. Accordingly, allocation and de-allocation of certain network resources can be problematic in these networks where traffic dynamics are continuously changing. Moreover, particularly in network systems that may handle large volumes of access device traffic, providing adequate security may also pose additional problems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a method and system for multiple encryption in a multi-band multi-protocol hybrid wired/wireless network. A method for multiple encryption in a multi-band multi-protocol hybrid wired/wireless network may include the step of receiving on a first PHY channel of an access point, a request for initiation of a communication session from an originating access device. The received request may be acknowledged on the first PHY channel. The originating access device may be authenticated using a second PHY channel. A communication session may be hosted over the first PHY channel, the second PHY channel or a third PHY channel.

At least one encryption/decryption key may be provided for use during the communication session. The authentication step may further include requesting authentication information from an authentication server and delivering at least a portion of the requested authentication information to the originating access device via a second PHY channel. The encryption key may be delivered to the originating access device via the first PHY channel or the second PHY channel. An identity of the originating access device may be received by the access point. The identity may be a WEP key, a MAC address, and/or an IP address.

In another aspect of the invention, a type of traffic generated by the originating access device on the first PHY channel may be determined. At least one encryption/decryption key may be generated dependent on the traffic type. The generated encryption/decryption key may be distributed via at least one of the second PHY channel and the third PHY channel. One or more virtual channels may be established to provide communication between the originating access device and a terminating access device. Information may subsequently be tunneled between the originating access device and the terminating access device using the virtual channel.

Another embodiment of the invention may provide a machine-readable storage, having stored thereon, a computer program having at least one code section for providing multiple encryption in a multi-band multi-protocol hybrid wired/wireless environment. The at least one code section may be executable by a machine and thereby cause the machine to perform the steps as described above.

Another embodiment of the invention may provide a system for multiple encryption in a multi-band multi-protocol hybrid wired/wireless network. The system may include an access point having at least one receiver which may be adapted to receive a request for initiating a communication session from an originating access device. The initiation request may be received on a first PHY channel of the access point. The receiver may be adapted to acknowledge the received request on the first PHY channel. At least one authenticator may be adapted to authenticate the originating access device using a second PHY channel. The first PHY channel, second PHY channel and/or a third PHY channel may be adapted to facilitate hosting of the communication session.

The authenticator may be configured to generate one or more encryption/decryption keys for use during the communication session. The authenticator may also receive requests for authentication information and to deliver at least a portion of the requested authentication information to the originating access device via the second PHY channel. The authenticator may be further configured to deliver the encryption keys to the originating access device via the first PHY channel or the second PHY channel. The receiver may be also adapted to receive an identity of the originating access device. The identity of originating access device may be a WEP key, a MAC address, and/or an IP address, for example.

The authenticator may determine a traffic type generated by the originating access device on the first PHY channel. One or more encryption/decryption keys may be generated by the authenticator depending on the determined traffic type. The authenticator may distribute the generated encryption/decryption key via the second PHY channel and/or the third PHY channel. The receiver may be adapted to establish one or more virtual channels between the originating access device and a terminating access device. The receiver may be adapted to tunnel information between the originating access device and the terminating access device. Additionally, the receiver may be configured to establish at least a portion of the virtual channel over at least a portion of one of the first PHY channel, the second PHY channel and the third PHY channel. In another aspect of the invention, the authenticator may be integrated with a switch or access point or it may be coupled separately to the hybrid wired/wireless network as a standalone component.

These and other advantages, aspects and novel features of the present invention, as well as details of an illustrated embodiment thereof, will be more fully understood from the following description and drawings.

DETAILED DESCRIPTION OF THE INVENTION

Aspects of the invention may include a method and system for providing multiple encryption in a multi-band multi-protocol hybrid wired/wireless network. Multiple encryption in a multi-band multi-protocol hybrid wired/wireless network may include receiving on a first PHY channel of an access point, a request for initiation of a communication session from an originating access device. The received request may be acknowledged on the first PHY channel and the originating access device may be authenticated on a second PHY channel. One or more encryption/decryption keys may be provided for use during the communication session. A third PHY channel or the first or second PHY channels may be adapted to host or facilitate the communication session. The authentication information may be requested and delivered to the originating access device via a second PHY channel. The encryption key may be delivered to the originating access device via the first PHY channel or the second PHY channel.

Additionally, information may be tunneled over a virtual channel established between the originating and a terminating access device. At least a portion of the virtual channel may include one of the first, second or third PHY channels.

In accordance with another aspect of the invention, an access point may be adapted to process authentication and message exchange information with a client or access device. A switch, for example, may be adapted to provide access control by filtering traffic using various policy parameters. Exemplary policy parameters may include application type, time-of-day, and/or a user level or priority. A dedicated encryption or authorization server such as a RADIUS server may be adapted to maintain a database containing at least information related to authorized users and policy parameter information. The authorization server may be adapted to generate encryption keys for some or all sessions based on an amount of traffic being generated by a session. The access point may also be adapted to implement various encryption/decryption algorithms or schemes to ensure secure communication for access devices, access points and/or switches. In one aspect of the invention, switches and/or access points may be configured to implement port access control to further ensure secure communication. A virtual private network may also be provided to ensure secure communication, for example, while access devices are roaming throughout the network.

Figure 1A:
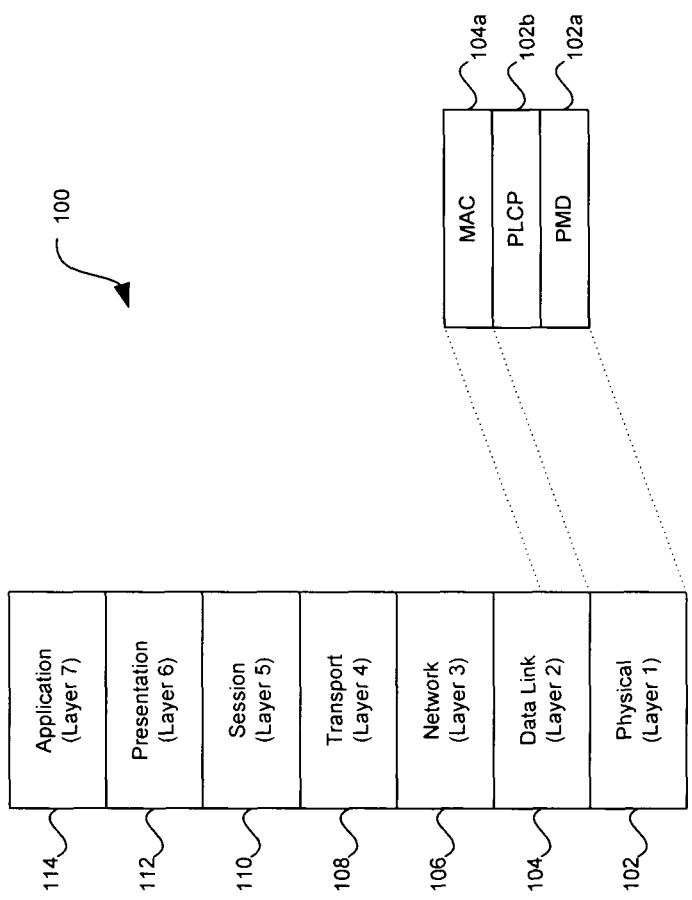
FIG. 1a is a block diagram of the OSI model.
Figure 1B:
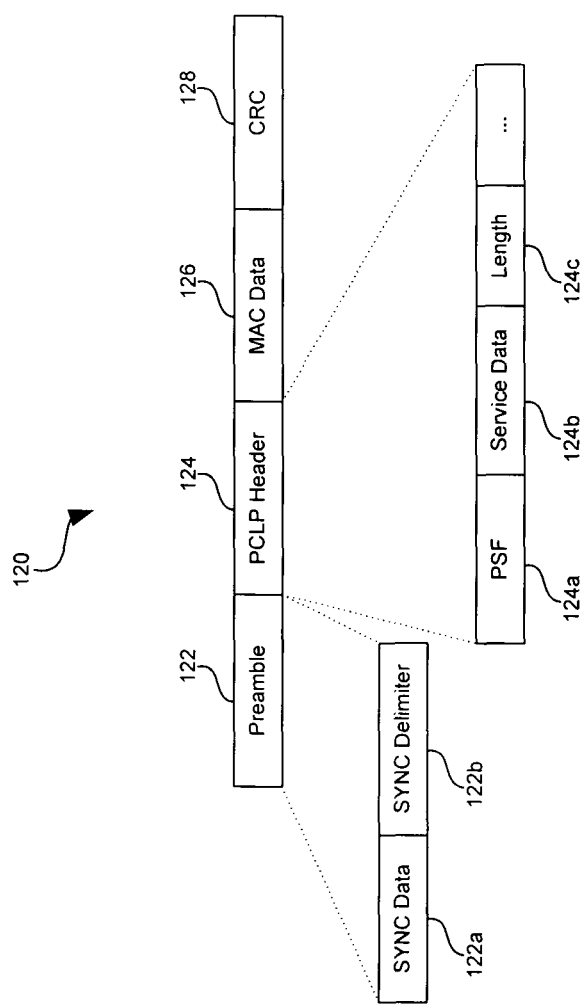
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PLCP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
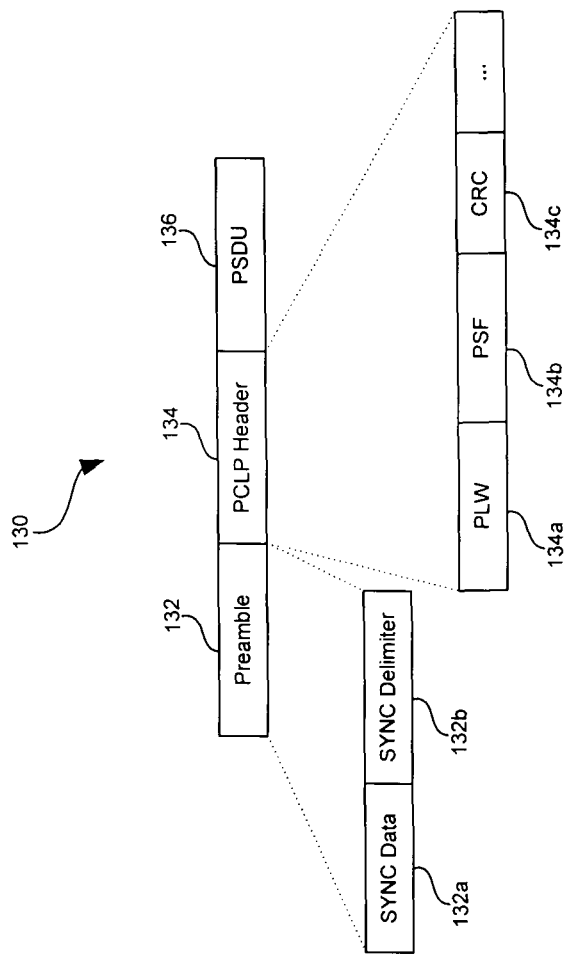
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown a SYNC data 132, PLCP header 134 and PSDU 136. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134be may be 4-bits in length and may be used to denote the communication data rate.

Figure 1D:
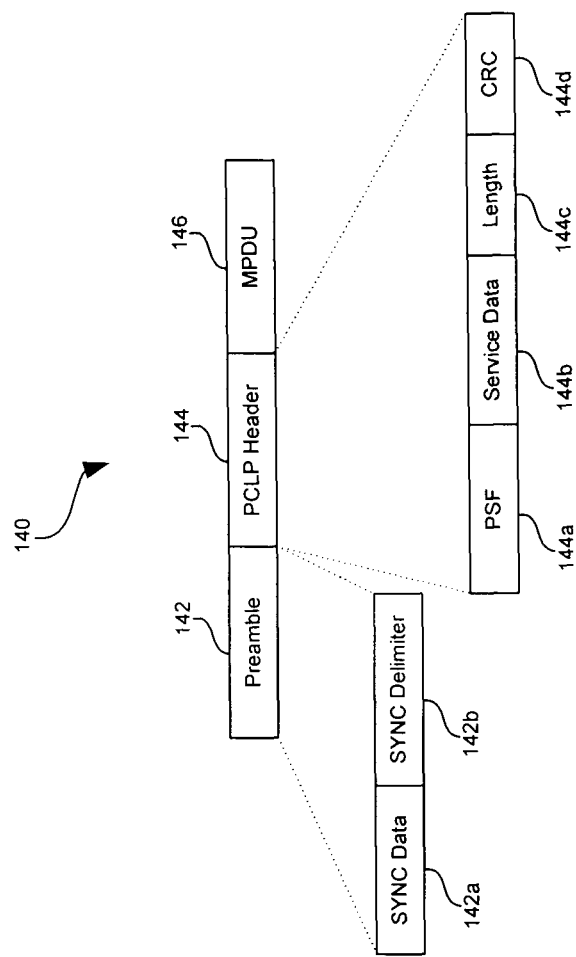
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PLCP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
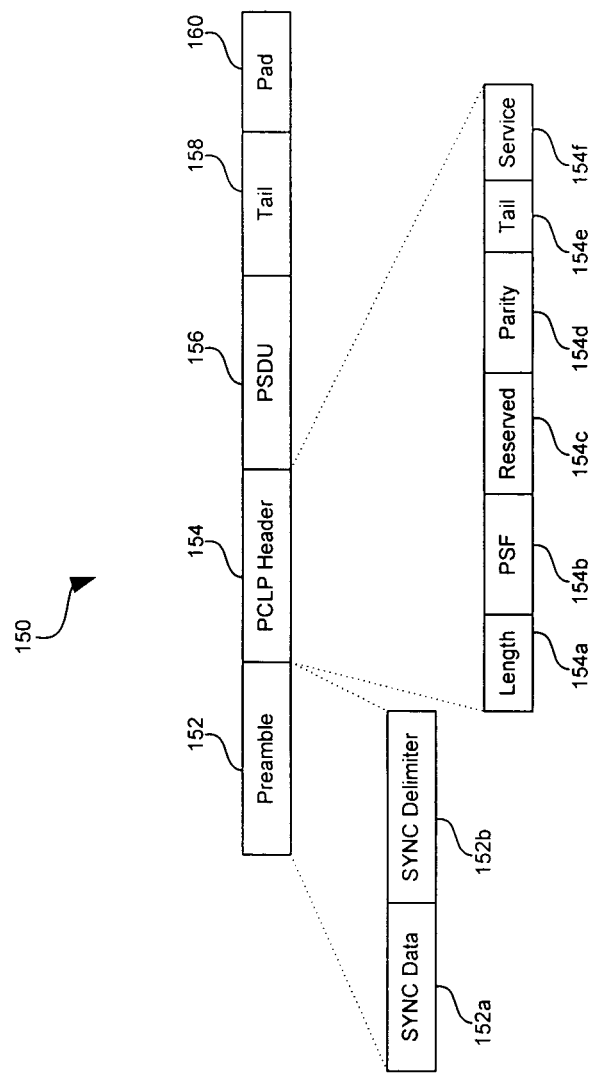
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PLCP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

In a typical hybrid wired/wireless network, as users roam from one network and/or domain to another, security may become a critical issue. In accordance with an aspect of the invention, multiple encryption keys may be utilized for different types of traffic or multiple virtual private networks (VPNs) management, for example, from a desktop machine. In a multiple-band multi-protocol environment, a method may be provided for establishing security on a particular PHY channel and acquiring a key for communication on another PHY channel. Private keys, for example, the name of access of point, a WEP key, or a MAC address of a client, may be validated via special authentication server.

A VPN may be established between various wired or wireless LANs using, for example, the Internet to establish virtual circuits for providing secure communication between the wired or wireless LANs. In one embodiment of the invention, in order to provide secure communication in the VPN, communication may be initiated and established over a secure link on a first channel or communication band. A second channel or communication band may be adapted to provide a secure link which may be utilized to obtain and distribute security and connectivity information for communication on a third channel or communication band. Accordingly, authentication may occur over the first channel, encryption/decryption keys may be requested and distributed via the second channel. Finally, actual data communication may occur over the third channel.

With reference to the physical layer, a first link may be established on a first PHY channel or communication band in order to initiate or establish a connection for a communication session. Security data, such as encryption/decryption key information may be communicated over a second PHY channel or communication band. Finally, actual communication of information may occur over a third PHY channel or communication band, or over either of the first or second PHY channel or communication band. In this regard, the channel resources may be relinquished and reused once these resources are no longer required. Since session initiation, authentication and encryption, and actual communication may occur on different channels or bands, the potential for compromising the security of the communicated information may be significantly reduced.

In one aspect of the invention, an 802.11b channel may be used to establish a link and to obtain a secure key and possibly other information necessary for communicating over, for example, an 802.11a channel. In this regard, in order to obtain an IEEE 802.11a link, two links or channels may have to be established, namely an 802.11(a) and an 802.11(b) link or channel. Alternatively, it may be necessary to establish a link on two different secure channels prior to permitting communication on a particular secure channel. Notwithstanding, the invention is not so limited and different channels or links could be established on the same band. For example, two or more 802.11a channels may be established or two or more 802.11b channels may be established. In another aspect of the invention, channels may also be established on a combination of communication bands. For example, two 802.11a channels may be established and one 801.11b channel may be established. Accordingly, initiation, authentication and encryption may occur on the two 802.11a channels, while actual data communication may occur on the 802.11b channel, for example.

In one embodiment of the invention, enhanced security may be provided in a WLAN environment. An access point may be adapted to utilize, for example, AES, TKIP, WPA and 802.1X to provide secure wireless access. A messaging protocol, for example, may be utilized to provide secure wireless access. A proxy authentication or challenge-response system may be provided for external server authentication using, for example, an NT domain, a LDAP server, a challenge handshake authentication protocol (CHAP) and/or a remote authentication dial-in-user service (RADIUS) server. In order to provide increased security, additional access policies may be adapted for access to the WLAN. In this regard, any one or more of a location based policy, time-of-day policy, user identity based policy, and an access control list (ACL) based policy may be implemented. A time-of-day policy may permit access at a specified time of the day. A location based policy may permit access to a specified location, such as, for example, a particular domain, a lobby, and/or a conference room. A user based policy may permit access based on an identity of a user, such as, for example, employees, visitors, contractors, and/or roamers. An access control list policy may permit access to certain entities on a list. The entity may be a server, an access device identity, and/or a person's identity. In accordance an aspect of the invention, a messaging protocol may be adapted to distribute authorization and access control for a communication session over the WLAN.

Additionally, the messaging protocol may be adapted for roaming. U.S. Provisional Application Ser. No. 60/433,122 entitled "Method and System for Network Management in a Hybrid Wired/Wireless Network" filed on Dec. 13, 2002 discloses a messaging protocol and is incorporated herein by reference in its entirety. A switch may be adapted to utilize the messaging protocol to maintain a state of security in order to ensure secure connections across the network.

In accordance with an embodiment of the invention, an access point may be adapted to facilitate authentication and message exchange with a client or access device. In one aspect of the invention, an client may initiate a request for establishing a communication session over a first PHY channel. The client may make the request to an access point. Client authentication may occur using a second PHY channel and encryption/decryption keys may be communicated between the access point and the client over this second PHY channel. Finally, actual communication of information between the access point and the client may occur over either one of the first or second PHY channels, or possibly a third PHY channel. These channels may be, for example, dedicated channels, stand alone channels, control channels or traffic channels.

A switch may be adapted to provide access control by filtering traffic using, for example, various policy parameters. Exemplary policy parameters may include, but are not limited to, application type, time-of-day, and a user defined priority or level. A dedicated encryption or authentication server such as a RADIUS or CHAP server may be adapted to maintain, for example, a database containing information related to authorized users and policy parameter information. The authentication server may be adapted to generate encryption keys for some or all communication sessions based on an amount of traffic being generated by the communication sessions.

In accordance with an aspect of the invention, the access point may also be adapted to implement various encryption/decryption algorithms or schemes. One or more switches or routing devices and/or access points within the network may be configured to implement port access and control in an effort to further enhance secure network access and communication. The encryption or authentication server may be adapted to perform authentication services and/or encryption/decryption based services. Notwithstanding, although the encryption or authentication server may be coupled as a separate device to the network, some or all of the functions or services provided by the encryption or authentication server may be implemented within an access point and/or a switch.

Figure 2:
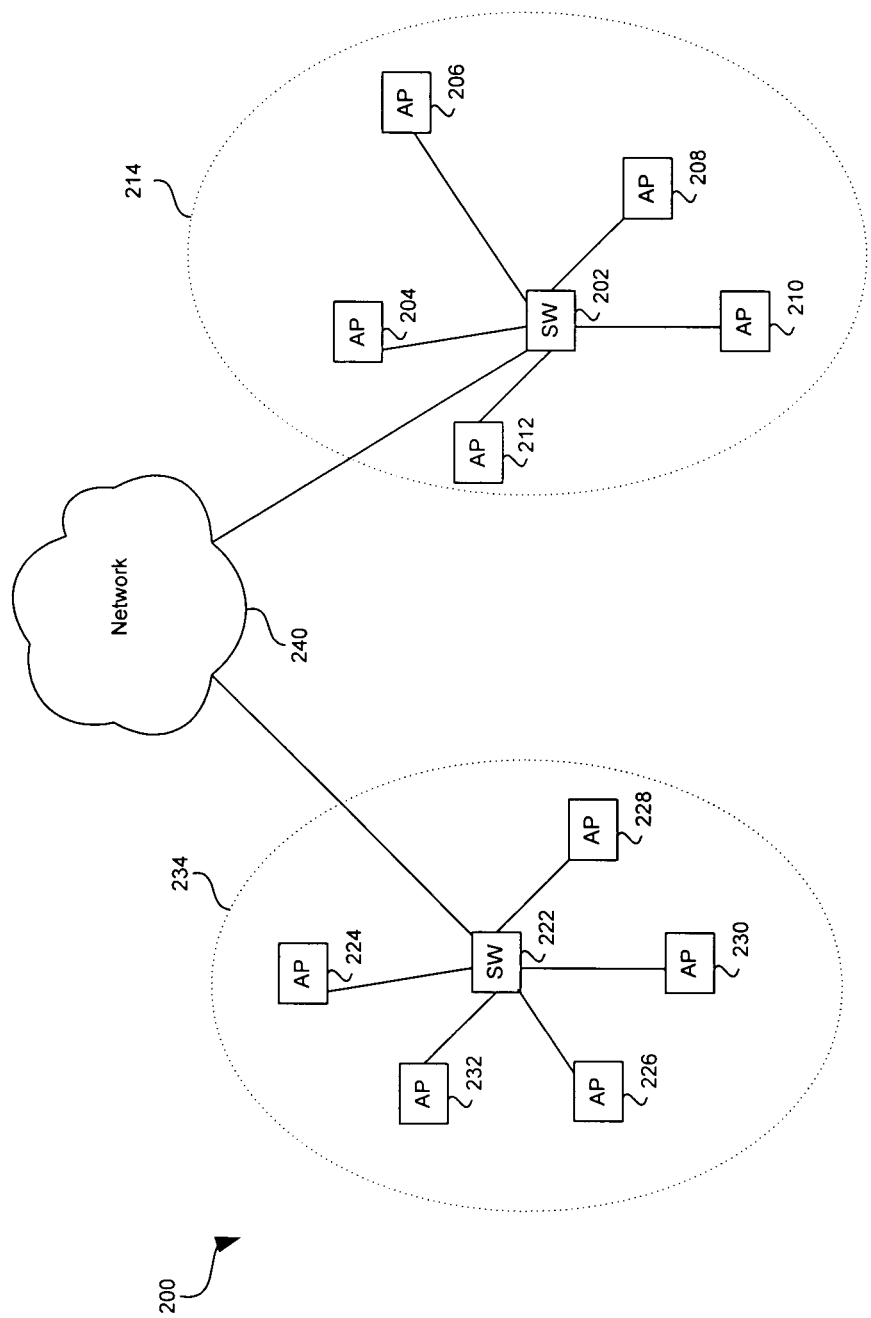
FIG. 2 is a block diagram of an exemplary virtual private network (VPN) in accordance with an embodiment of the invention.

FIG. 2 is a block diagram of an exemplary virtual private network in accordance with an embodiment of the invention. Referring to FIG. 2, there is illustrated a network 240, a first networking domain 214 and a second networking domain 234. The first networking domain 214 may include a switch 202, and access points 204, 206, 208, 210, 212. Each of access points 204, 206, 208, 210, 212 may be coupled to the switch 202. The second networking domain 234 may include a switch 222, and access points 224, 226, 228, 230, 232. Each of access points 224, 226, 208, 230, 232 may be coupled to the switch 222. Switch 222 may be coupled to switch 202 through any one or more of a wired and a wireless medium.

Although not shown, at least some of the access points in any one of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domain 214, 234 may be part of a single networking entity, but may represent separate security domains within the single networking entity. Moreover, the virtual channels may be used to establish a virtual private network in accordance with an embodiment of the invention.

The network 240 may be the Internet, for example, and may function as a transport network to provide communication between networking domains 214 and 234. Accordingly, switch 202 may communicate with switch 222 via network 240. In one aspect of the invention, communication between the switches 202, 222 may occur via virtual channels established across network 240. In this regard, a virtual private network (VPN) may be established between the first networking domain 214 and the second networking domain 234.

In operation, any one or more of the switches 202, 222 may be adapted to send network management related information and parameters to any one or more of the access points in any one or more of the networking domains 214, 234. In one embodiment of the invention, for example, switch 202 may be adapted to communicate bandwidth information to access point 206, both of which may be in the first networking domain 214. Similarly, switch 202 may be adapted to send network management related information to any one or more of access points 204, 208, 210, 214. Similarly, switch 222 may be adapted to communicate network management related information to any one or more of access points 224, 226, 228, 230, 232. The bandwidth information and/or network management related information may be used by an access point to efficiently allocate and/or de-allocate bandwidth for associating and/or dissociating access devices which may migrate between the first networking domain 214 and the second networking domain 234.

The switches 202, 222 may be adapted to provide, for example, certain QoS management activities to the access points using, for example, a messaging protocol. Accordingly, some activities such as bandwidth policing, bandwidth management, load balancing, roaming and handover may be handled by coordinating one or more switches and one or more access points utilizing, for example, the messaging protocol. Notwithstanding, a switch, for example switch 222, may be configured to establish rules that may be adapted by the access points 224, 226, 228, 230, 232 in carrying out these activities. The rules may be propagated from the switches 222, 202 to the access points 204, 208, 210, 214, 224, 226, 228, 230, 232 using, for example, the messaging protocol.

Prioritization and processing, for example, may be based on acceptable levels of latency and bandwidth availability. For example, an IP telephone call may be assigned highest queuing and processing priority in order to minimize latency. Policing, for example, may include performing activities which may limit and control the usage of available bandwidth by a particular access device or a type of access device. These and other tasks may be controlled by the switch using the messaging protocol. Although activities such as policing, bandwidth and QoS management may be conducted independently of access point aggregation and resiliency, in accordance with an aspect of the invention, QoS management related information may be utilized for bandwidth management.

In operation, any one or more of the access points in any one or more of the networking domains may be adapted to acquire various bandwidth related information and parameters and communicate the bandwidth related information to one or more of the switches 202, 222. For example, access point 206 may be adapted to acquire various bandwidth related information and communicate the acquired information back to the switch 202. Similarly, any one or more of access points 204, 208, 210, 214 may acquire various bandwidth related information and parameters and communicate the acquired information to switch 202. In another aspect of the invention, any one or more of access points 224, 226, 228, 230, 232 may acquire various bandwidth related information and parameters and communicate the acquired information to the switch 222.

Any one or more of access points 224, 226, 228, 230, 232 may acquire various bandwidth related information and parameters and communicate the acquired information to the switch 202 through switch 222. This may be particularly useful in, for example, a roaming scenario or handoff scenario. Communication of the bandwidth or other information between switches 202, 222 may occur via virtual channels established over the network 240. In both the roaming and handoff scenarios where a particular access device is roaming or being handed off from networking domain 234 to networking domain 214, it may be advantageous to acquire bandwidth related information pertaining to networking domain 214 before permitting an access device to acquire service from networking domain 214. In this case, switch 222 may initiate a query requesting bandwidth related information from switch 202. Consequently, switch 214 may request bandwidth related information from any one or more of access points 204, 206, 208, 210, 212. Once switch 202 gets the bandwidth related information from these access points, it may communicate the information to the switch 222. Accordingly, the switch 222 may decide whether to handoff or permit roaming depending on the bandwidth related information received from the switch 202.

Based on bandwidth related information received from one or more access devices or switches, a switch may be adapted to force an access device to roam. For example, in a case where the switch determines that there may be insufficient bandwidth or channel capacity, then the switch may be adapted to dynamically force existing and/or new incoming access devices to roam. In one aspect of the invention, a list of devices which have been forced to roam may be maintained. Accordingly, if a switch determines that there is sufficient channel capacity available, then the switch may be adapted to signal or notify devices on the list to reattempt establishment of service and permit access to the service provided by the network. In this regard, any one or more of the switches 202, 222 may be adapted to determine the total available bandwidth for any one or more of a plurality of access points and/or switches. Accordingly, the switches 202 and/or 222 may provide channel/frequency management and quality of service (QoS) management in order to optimize bandwidth utilization for a plurality of access devices.

Based on various bandwidth related information, an access prioritization scheme may be adapted and enforced by, for example, any one or more of the switches 202, 222. The prioritization scheme may include, establishing a priority for all network traffic, honoring prioritized traffic from all clients, and/or honoring prioritized traffic from some select clients such as trusted clients. In another aspect of the invention, the switches 202, 222 may be adapted to provide certain QoS management activities to the access points. Accordingly, some activities such as bandwidth policing, bandwidth management, packet prioritization and processing, and service type queuing may be handled by an access point. Notwithstanding, a switch may be adapted to establish rules that may be utilized by the access points in carrying out these activities. Prioritization and processing, for example, may be based on acceptable levels of latency and bandwidth availability. For example, an IP telephone call may be assigned highest queuing and processing priority in order to minimize latency. Policing, for example, may include tasks which limit and control the usage of available bandwidth by a particular access device or a type of access device.

The switch may be adapted to utilize the messaging protocol (MP) to provide enhanced communication services to one or more of a plurality of access devices or mobile stations in, for example, an enterprise Wireless LAN (WLAN). The enhanced communication, in addition to ordinary WLAN device communication such as authentication, authorization, key exchanges, beacon broadcast, etc., may provide additional features not provided by a WLAN to its clients. These additional features may include, but are not limited to, bandwidth management, access control, load balancing, network management and quality of service. In addition to switches, other enterprise WLAN devices that may utilize messaging protocol message transactions may include but are not limited to, wireless access points, enterprise switches and wireless stations. These devices may be messaging protocol enabled in certain instances.

In accordance with an aspect of the invention, an exemplary WLAN Architecture may be provided. In the enterprise Wireless LAN environment, the wireless devices may be located at the edge of the network. The wireless devices may be connected or coupled to the enterprise network via one or more access points, which in turn may be the edge devices of, for example, a wired LAN or the Internet. The access points may be connected to the Internet via switches. These switches may be called wireless LAN switches, and in certain instances, may not only perform Layer 2 switching, but may be adapted to function as a wireless edge manager. They may also provide additional functionalities such as access point aggregation and resiliency, bandwidth management, access control, firewall functions, traffic privacy and quality of service (QoS), network management, and load balancing. Notwithstanding, the edge devices may not be restricted to being switches, but may be other suitable switching compatible equipment such as soft switches and routers, for example.

A VPN may be created by the first networking domain 214 which may be a wireless LAN, the second network 234 which may be a wireless LAN, and the network 240, the latter of which may be the Internet. In order to ensure secure communication in the VPN, data communicated in the VPN may be authenticated to ensure that it originates from its purported source. Moreover, it may be necessary for data to remain confidential as it moves within and between networks. For example, as data moves from the first WLAN of the first networking domain across the Internet 240 to the second WLAN of the second networking domain, the VPN must prevent the data from being read or copied by unauthorized users. Additionally, even within each of the first and second WLAN, the VPN may be required to prevent data from being read, copied or corrupted by unauthorized users. Finally, the VPN may be adapted to authenticate users to the network, thereby restricting and preventing unauthorized users from gaining network access. In accordance with the invention, authentication and communication may occur on different PHY channels, on different communication bands or on a combination thereof.

Figure 3:
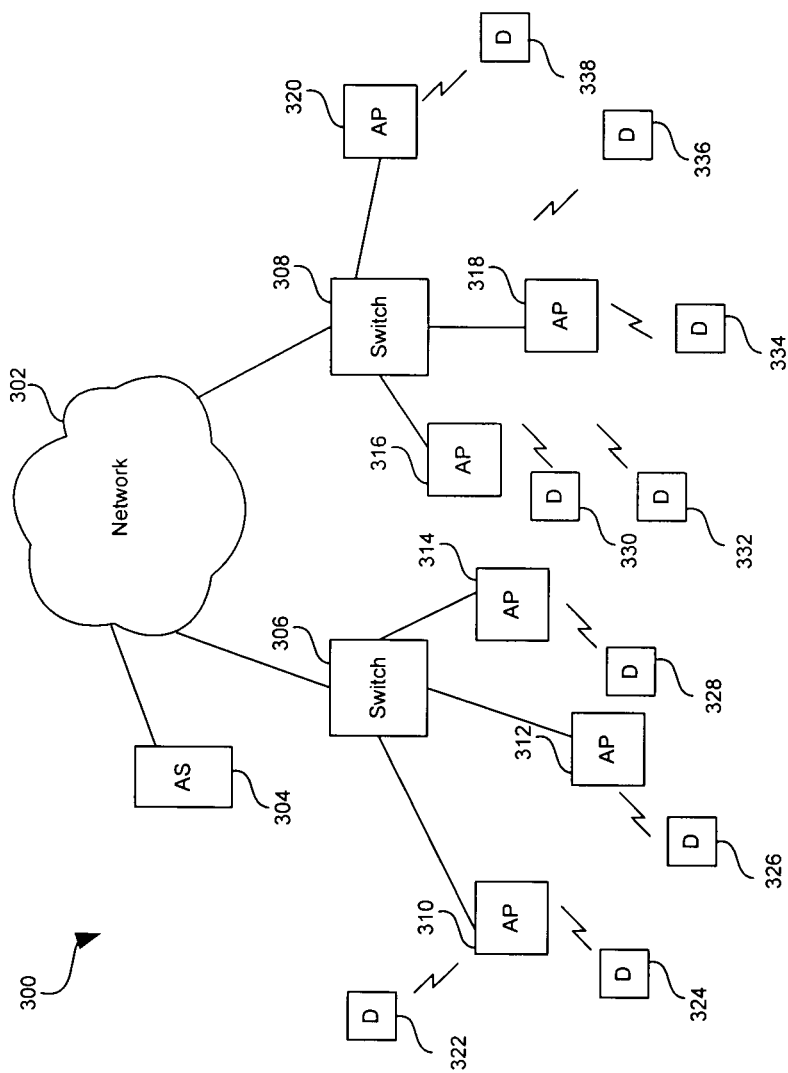
FIG. 3 is a block diagram 300 of an exemplary Enterprise Wireless LAN adapted to function as a virtual private network (VPN) in accordance with an embodiment of the invention.

FIG. 3 is a block diagram 300 of an exemplary Enterprise Wireless LAN adapted to function as a virtual private network (VPN) in accordance with an embodiment of the invention. Referring to FIG. 3, there is shown, a network 302, authentication server or authenticator 304, switches 306, 308, access points (APs) 310, 312, 314, 316, 318, 320 and access devices 322, 324, 326, 328, 330, 332, 334, 336, 338. The switches 306, 308 and access points 310, 312, 314, 316, 318, 320 may be adapted to communicate using, for example, an 802.11x compatible Ethernet protocol. The switches 306, 308 may be adapted to switch regular layer 2 frames. However, within the switch, knowledge of a WLAN and its management intelligence may reside primarily in software. Similarly, the authentication server 304 may be, for example, an authentication gateway or security server. Notwithstanding, the invention is not limited in this regard.

The network 302 may be the Internet, an Intranet, a wireless LAN, a wired LAN, or any combination thereof. In a case where the network 302 may be the Internet, an Internet Service Provider (ISP) may provide service between the network 302 and the switches or edge device 306, 308. In this regard, virtual channels may be established across network 302 to provide communication across the VPN. Alternatively, leased and/or shared virtual links may be used to provide dynamic virtual circuits for communication between the network 302 and the switches or edge devices 306, 308.

Secure wireless transmission or communication may be provided between the access devices or clients, and the access points. This may be also be true for the wired connections between any of the access points 310, 312, 314, 316, 318, 320 and the switches 306, 308. In this regard, the authentication server 304 may be adapted to provide, for example, authentication, access control, and data integrity and confidentiality. The authentication server 304 may be a password-based system and/or or a challenge-response system. The authentication server 304 may be adapted to utilize, for example, a challenge handshake authentication protocol (CHAP) and/or a remote authentication dial-in user service (RADIUS) to provide authentication and access control. In another aspect of the invention, the VPN comprising the WLAN may be adapted to utilize digital certificates or tokens to control network access and to properly authenticate network users. The tokens may be hardware generated, although the invention is not limited in this regard.

The VPN may utilize tunneling to ensure data integrity and confidentiality. In this regard data communicated in the VPN, such as data communicated between access devices 322, 324, 326, 328, 330, 332, 334, 336, 338, access points 310, 312, 314, 316, 318, 320, switches 306, 308 and Internet 302 may be encapsulated in within Internet protocol (IP) packets to create a tunnel. Encapsulating the communicated data within IP packets may camouflage or protect the data from pertinent routing and switching information from being revealed during transmission. This may prevent those who transmit and receive the communicated data from identifying information located within encapsulated data packets. The encapsulated data may be encrypted to further enhance data security, including integrity and confidentiality.

In one aspect of the invention, the access devices 322, 324, 326, 328, 330, 332, 334, 336, 338 may include suitable client application that may be adapted to establish and maintain a tunnel upon initiation of communication with an access point. Accordingly, the client application may be adapted to interact or otherwise communicate with the authentication server 304 via a switch that serves the access point to which the access device may be connected. Once the tunnel has been established, encapsulated information may be communicated across the VPN by the access device. For example, access device 338, which may be served by access point 320, may request communication with access device 322, which may be served by access point 310. Prior to establishing communication with access device 338, access point 320, may be adapted to request authentication of the access device 338 by the authentication server 304. During the authentication process, authentication server 304 may be adapted to also authenticate destination access device 322.

Subsequent to authentication of the originating access device 338 and the destination access device 322, a virtual connection may be established over the VPN. The authentication server 304 may be adapted to create a tunnel that may provide secure communication between the originating access device 338 and the destination access device 322. Data communicated over the virtual connection may be further encrypted to ensure secure communication. Upon termination of the communication session between the originating access device 338 and the destination access device 322, network resources such as resources used for the virtual circuits and data tunnels may be released.

Figure 4:
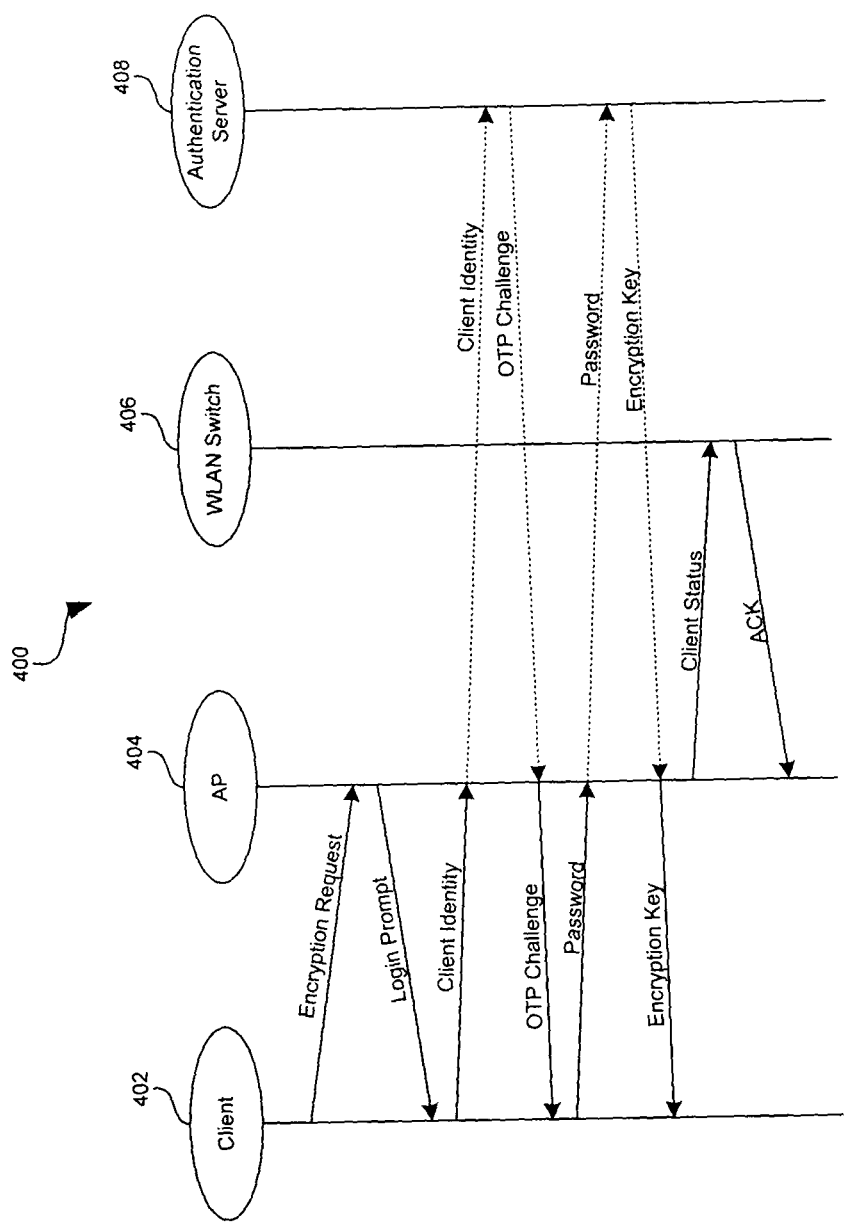
FIG. 4 is a block diagram of an exemplary message exchange that may be utilized for initiation of a secure VPN communication session in accordance with an embodiment of the invention

FIG. 4 is a block diagram of an exemplary message exchange that may be utilized for initiation of a secure VPN communication session in accordance with an embodiment of the invention. Referring to FIG. 4, the session initiation may include interaction between one or more of a client 402, an access point (AP) 404, a WLAN switch (WS) 406 and an authentication server (AS) 408. Prior to the session initiation, the AP 402 may have broadcasted beacon frames to some or all wireless device in its vicinity to announce its presence and its MAC address. Any client device attempting to connect may therefore know where to send a request.

Referring to FIG. 4, the client 402 may send a connection request to AP 404. The AP 404 may determine that client 402 is a new client initiating a new session and send a login prompt to the client 402. The client 402 may respond with its identity. The AP 404 may send its identity to the AP and the identity may be forwarded to the AS 408. The AS 408 may respond with a One-Time Password (OTP) challenge. The AP 404 may send an OTP challenge to client 402. The client 402 may respond to AP 404 with a password. The AP 404 may send the client password to AS 408. Upon successful authentication by the AS 408, AS 408 may respond with, for example, an encryption key. The AP 404 may pass the encryption key to the client 402.

The AP 404 may also be adapted to communicate client status information, such as an identity and/or MAC address, to the WS 406. The WS 406 may, for example, enable additional access control for the client 402. Enabling access control may for example, includes, but is not limited to, information such as subnet information, time or duration, location information, and/or QoS. The WS 406 may send an acknowledgement (ACK) to the AP 404. In one aspect of the invention, the ACK and the client status may be sent using a messaging protocol (MP) message. The other messages may be sent using, for example, an extensible authentication protocol (EAP). The EAP from 802.1x suite of protocols may be utilized for session authentication, and the MP may facilitate communication between the AP 404 and WLAN switch 406. WS 406 may be adapted to request data for some or all sessions currently associated with an AP.

Figure 5:
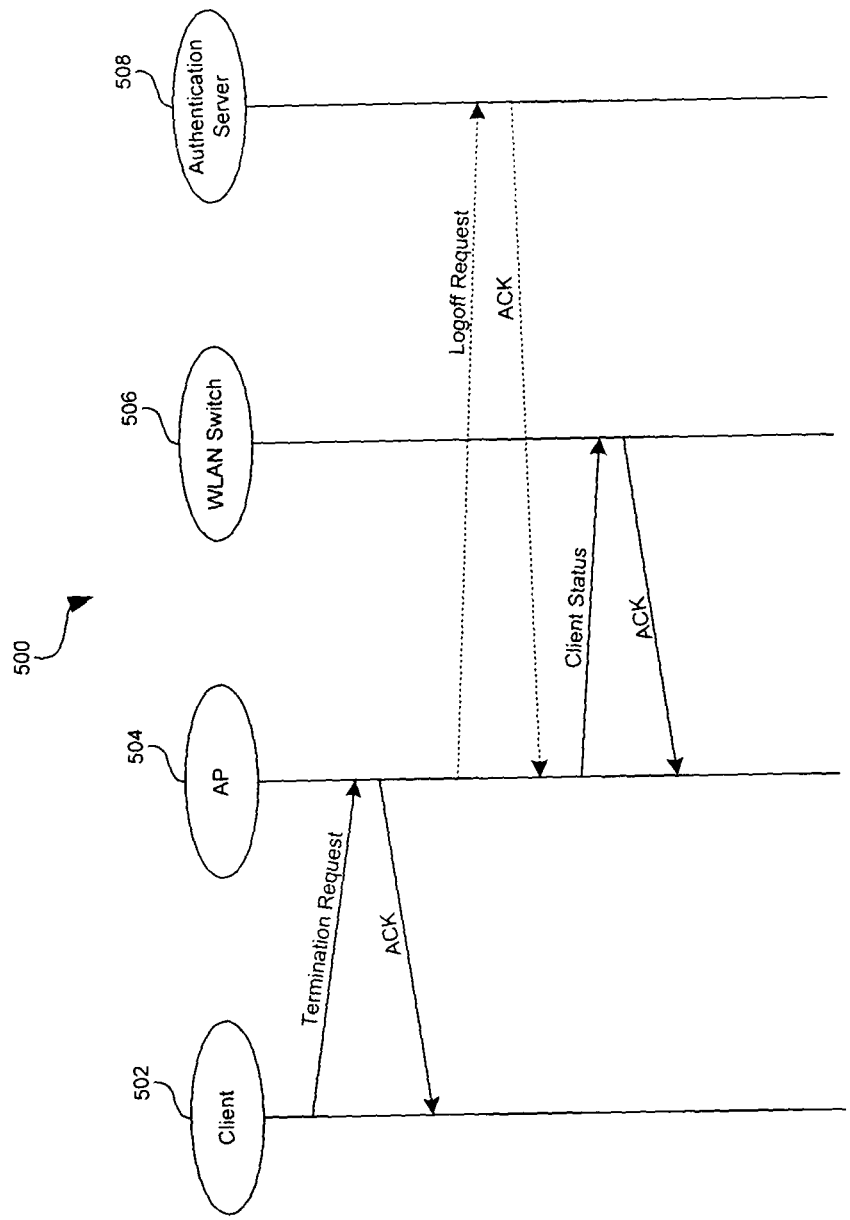
FIG. 5 is a block diagram of an exemplary message exchange that may be utilized for termination of a secure VPN communication session in accordance with an embodiment of the invention.

FIG. 5 is a block diagram of an exemplary message exchange that may be utilized for termination of a secure VPN communication session in accordance with an embodiment of the invention. Referring to FIG. 5, the exemplary session termination may include communication between one or more of a client 502, an access point (AP) 504, a WLAN switch (WS) 506 and an authentication server (AS) 508. The session termination may occur as part of a client logoff procedure, an idle session termination, access policy violation termination or even by an act initiated by, for example, a network administrator.

Notwithstanding, with reference to FIG. 5, the client 502 may send a logoff request to AP 504. The AP 504 may acknowledge the request with an ACK. The AP 504 may send a logoff request to the AS 508. The AS 508 may also respond with an ACK. The AP 504 may send a client status of logoff to the WS 506. The WS 506 may send and ACK to the AP 504. The WS 506 may cleanup any session information established for the client 502. In one aspect of the invention, the ACK and the client status may be sent using the messaging protocol (MP). The other messages may be sent using, for example, an extensible authentication protocol (EAP). The EAP from an 802-based protocol may be utilized for session authentication, and the MP may facilitate communication between the AP 504 and WLAN switch 506. WS 506 may be adapted to request data for some or all communication sessions currently associated with an AP.

A handoff may be a pseudo session initiation/termination, but without a need for authentication. Handoff may be triggered by detection of a strong new signal and degradation of an old signal, in addition to receiving a broadcast beacon of a new AP. In an Enterprise WLAN, for example, there may be two types of handoff, namely intra-switch which may involve handoff between two APs that may be connected to the same WLAN switch, and inter-switch handoff which may involve handoff between two APs that may be connected to different WLAN switches. Inter-switch handoff may involve transferring information between the two switches.

Figure 6:
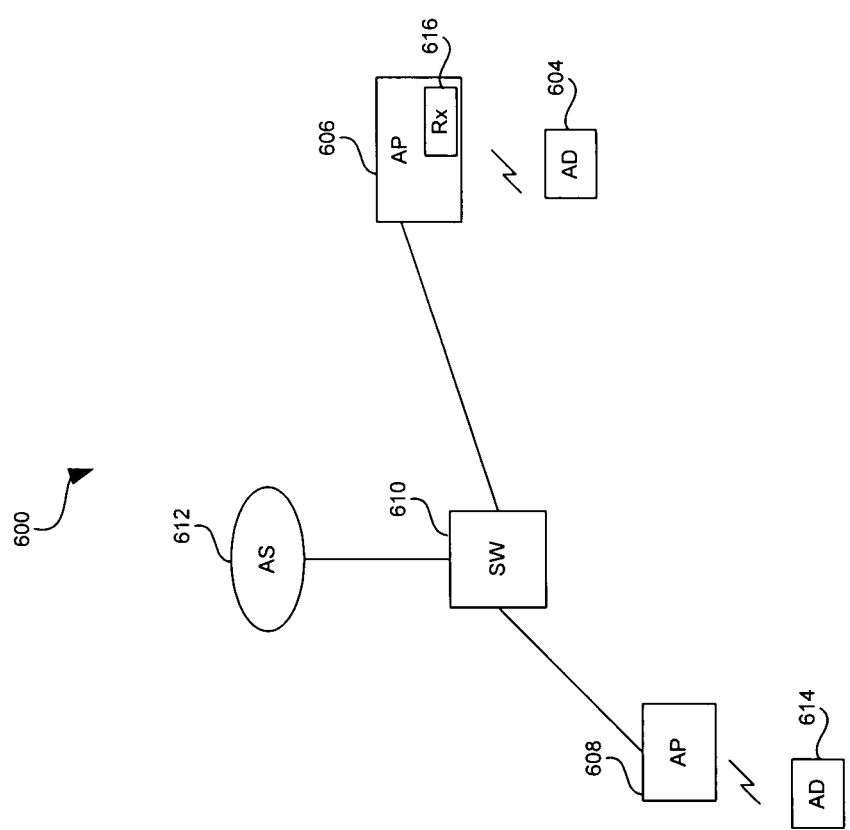
FIG. 6 is a high level block diagram of a system for providing multiple encryption in a multi-band multi-protocol hybrid wired/wireless network in accordance with an embodiment of the invention.

FIG. 6 is a high level block diagram of a system 600 for providing multiple encryption in a multi-band multi-protocol hybrid wired/wireless network. Referring to FIG. 6, there is shown an originating access device or client 604, a terminating access device 614, access points 606, 608, switch 610 and authenticator 612. Access point 606 may be the serving access point for access device 604 and access point 608 may be the serving access point for access device 614. Access points 606, 608 may be coupled to switch 610. Access point 606 may include an integrated receiver 616. Authenticator 612 may be an encryption or authentication server.

In operation, receiver 616 may be adapted to receive a request for initiation of a communication session from originating access device 604. The request for initiation may be received on a first PHY channel of access point 606. The receiver 616 may be adapted to acknowledge the received request on the first PHY channel. Authenticator 612 may be configured to authenticate the originating access device 604 using a second PHY channel. The first PHY channel, second PHY channel and/or a third PHY channel may be adapted to facilitate the communication session, which may be established between originating access device 604 and terminating access device 614, for example. The first, second and/or third PHY channels may be on the same communication band and/or on different communication bands.

The authenticator 612 may be also adapted to generate one or more encryption/decryption keys for use during the communication session. The authenticator 612 may receive requests for authentication information and deliver at least a portion of the requested authentication information to the originating access device 604 via the second PHY channel. The authenticator 612 may be further adapted to deliver the encryption keys to the originating access device via the first PHY channel or the second PHY channel. The receiver 616 of access point 606 may be adapted to receive an identity of the originating access device. The identity of originating access device may be a WEP key, a MAC address, and/or an IP address, for example.

The authenticator 612 may be adapted to determine a traffic type corresponding to the traffic generated by the originating access device 604 on the first PHY channel. The authenticator 612 may generate one or more encryption/decryption keys depending on the determined traffic type and distribute the generated encryption/decryption key via the second or third PHY channels. The receiver 616 may be adapted to establish one or more virtual channels between the originating access device 604 and the terminating access device 614. The receiver 616 may be adapted to tunnel information between the originating access device 604 and the terminating access device 614. The receiver 616 may also establish at least a portion of the virtual channel over at least a portion of one of the first, second and third PHY channels. In another aspect of the invention, some or all of the functions of the authenticator 612 may be integrated within switch 110 or access points 606, 608. Alternatively, authenticator 612 may be coupled separately to the hybrid wired/wireless network as a stand-alone component. For example, authenticator 612 may be coupled to the switch 610 as illustrated in FIG. 6.

In accordance with another embodiment of the invention, dependent on the modulation scheme utilized, one or more of the PLCP frames illustrated in FIG. 1b, FIG. 1c, FIG. 1d and FIG. 1e may be adapted to contain information which may be utilized for providing communication between the plurality of access points in one or switches in accordance with various embodiments of the invention. Additionally, the PLCP frames may be adapted to convey information for any one or more of the 801.11a, 802.11b and 802.11g modes of operation utilized by access points and/or access devices in accordance the embodiments of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for multiple encryption in a multi-band multi-protocol hybrid wired/wireless network, the method comprising:
   receiving on a first PHY channel of an access point, a request for initiation of a communication session from an originating access device;
   authenticating said communication session by authenticating said originating access device using a second PHY channel; and
   hosting said communication session over a third PHY channel, said third PHY channel established between said access point and said originating access device.

2. The method according to claim 1, comprising generating at least one encryption/decryption key for use during said communication session.

3. The method according to claim 2, wherein said authenticating comprises requesting authentication information from an authentication server.

4. The method according to claim 3, wherein said authenticating comprises delivering at least a portion of said authentication information received from said authentication server to said originating access device via said second PHY channel.

5. The method according to claim 4, comprising delivering said at least one encryption/decryption key to said originating access device via one of said first PHY channel or said second PHY channel.

6. The method according to claim 1, comprising receiving an identification of said originating access device by said access point.

7. The method according to claim 6, wherein said identity of said originating access device is one or more of a WEP key, a MAC address, and/or an IP address.

8. The method according to claim 1, comprising acknowledging said received request on said first PHY channel.

9. The method according to claim 1, comprising determining a type of traffic generated by said originating access device on said first PHY channel.

10. The method according to claim 9, comprising generating at least one encryption/decryption key dependent on said determined traffic type.

11. The method according to claim 10, comprising distributing said generated at least one encryption/decryption key via one or both of said second PHY channel and/or said third PHY channel.

12. The method according to claim 1, comprising establishing at least one virtual channel between said originating access device and a terminating access device.

13. The method according to claim 12, comprises tunneling information between said originating access device and said terminating access device.

14. The method according to claim 12, comprising establishing at least a portion of said at least one virtual channel over at least a portion of one of said first PHY channel, said second PHY channel or said third PHY channel.

15. A non-transitory machine-readable storage, having stored thereon, a computer program having at least one code section for providing multiple encryption in a multi-band multi-protocol hybrid wired/wireless network, the at least one code section executable by a machine for causing the machine to perform the steps comprising:
   receiving on a first PHY channel of an access point, a request for initiation of a communication session from an originating access device;
   authenticating said communication session by authenticating said originating access device using a second PHY channel; and
   hosting said communication session over a third PHY channel, said third PHY channel established between said access point and said originating access device.

16. The non-transitory machine-readable storage according to claim 15, comprising code for generating at least one encryption/decryption key for use during said communication session.

17. The non-transitory machine-readable storage according to claim 16, wherein authenticating code comprises code for requesting authentication information from an authentication server.

18. The non-transitory machine-readable storage according to claim 17, comprising code for delivering at least a portion of said authentication information received from said authentication server to said originating access device via said second PHY channel.

19. The non-transitory machine-readable storage according to claim 18, comprising code for delivering said at least one encryption/decryption key to said originating access device via one of said first PHY channel or said second PHY channel.

20. The non-transitory machine-readable storage according to claim 15, comprising code for receiving an identification of said originating access device by said access point.

21. The non-transitory machine-readable storage according to claim 20, wherein said identity of said originating access device is one or more of a WEP key, a MAC address, and/or an IP address.

22. The non-transitory machine-readable storage according to claim 15, comprising code for acknowledging said received request on said first PHY channel.

23. The non-transitory machine-readable storage according to claim 15, comprising code for determining a type of traffic generated by said originating device on said first PHY channel.

24. The non-transitory machine-readable storage according to claim 23, comprising code for generating at least one encryption/decryption key dependent on said determined traffic type.

25. The non-transitory machine-readable storage according to claim 24, comprising code for distributing said generated at least one encryption/decryption key via one or both of said second PHY channel and/or said third PHY channel.

26. The non-transitory machine-readable storage according to claim 15, comprising code for establishing at least one virtual channel between said originating access device and a terminating access device.

27. The non-transitory machine-readable storage according to claim 26, comprises code for tunneling information between said originating access device and said terminating access device.

28. The non-transitory machine-readable storage according to claim 26, comprising code for establishing at least a portion of said at least one virtual channel over at least a portion of one of said first PHY channel, said second PHY channel or said third PHY channel.

29. A system for multiple encryption in a multi-band multi-protocol hybrid wired/wireless network, the system comprising:
  at least one receiver of an access point adapted to receive on a first PHY channel, a request for initiation of a communication session from an originating access device;
  at least one authenticator adapted to authenticate said communication session by authenticating said originating access device using a second PHY channel; and
  a third PHY channel being adapted to facilitate hosting of said communication session, said third PHY channel established between said access point and said originating access device.

30. The system according to claim 29, wherein said at least one authenticator is adapted to generate at least one encryption/decryption key for use during said communication session.

31. The system according to claim 30, wherein said at least one authenticator is adapted to receive requests for authentication information.

32. The system according to claim 31, wherein said authenticator is adapted to deliver at least a portion of said authentication information received from said authentication server to said originating access device via said second PHY channel.

33. The system according to claim 32, wherein said at least one authenticator is adapted to deliver said at least one encryption/decryption key to said originating access device via one of said first PHY channel or said second PHY channel.

34. The system according to claim 29, wherein said at least one receiver is adapted to receive an identification of said originating access device by said access point.

35. The system according to claim 34, wherein said identity of said originating access device is one or more of a WEP key, a MAC address, and/or an IP address.

36. The system according to claim 29, wherein said at least one receiver is adapted to acknowledge said received request on said first PHY channel.

37. The system according to claim 29, wherein said at least one authenticator is adapted to determine a type of traffic generated by said originating access device on said first PHY channel.

38. The system according to claim 37, wherein said at least one authenticator is adapted to generate at least one encryption/decryption key dependent on said determined traffic type.

39. The system according to claim 38, wherein said at least one authenticator is adapted to distribute said generated at least one encryption/decryption key via one or both of said second PHY channel and/or said third PHY channel.

40. The system according to claim 29, wherein said at least one receiver is adapted to establish at least one virtual channel between said originating access device and a terminating access device.

41. The system according to claim 40, wherein said at least one receiver is adapted to tunnel information between said originating access device and said terminating access device.

42. The system according to claim 40, wherein said at least one receiver is adapted to establish at least a portion of said at least one virtual channel over at least a portion of one of said first PHY channel, said second PHY channel or said third PHY channel.

* * * * *